(12) United States Patent
Oishi

(10) Patent No.: US 9,376,165 B2
(45) Date of Patent: Jun. 28, 2016

(54) BICYCLE SPROCKET

(75) Inventor: Toshinari Oishi, Osaka (JP)

(73) Assignee: Shimano Inc., Osaka (JP)

(*) Notice: Subject to any disclaimer, the term of this patent is extended or adjusted under 35 U.S.C. 154(b) by 1746 days.

(21) Appl. No.: 12/580,664

(22) Filed: Oct. 16, 2009

(65) Prior Publication Data

US 2011/0092327 A1    Apr. 21, 2011

(51) Int. Cl.
*F16H 55/12* (2006.01)
*F16H 55/30* (2006.01)
*B62M 9/10* (2006.01)

(52) U.S. Cl.
CPC ...................... *B62M 9/10* (2013.01)

(58) Field of Classification Search
CPC .......... B62M 9/10; B62M 9/105; B62M 9/06; B62M 9/122; F16H 55/30
USPC .......................... 474/160, 162, 164
See application file for complete search history.

(56) References Cited

U.S. PATENT DOCUMENTS

| | | | |
|---|---|---|---|
| 4,889,521 A * | 12/1989 | Nagano ........................ 474/164 |
| 5,073,151 A * | 12/1991 | Nagano ........................ 474/160 |
| 5,503,598 A * | 4/1996 | Neuer et al. ................... 474/78 |
| 6,013,001 A | 1/2000 | Miyoshi |
| 6,139,456 A * | 10/2000 | Lii et al. ........................ 474/152 |
| 6,340,338 B1 * | 1/2002 | Kamada ........................ 474/160 |
| 7,004,867 B2 | 2/2006 | Wei |
| 7,942,771 B2 * | 5/2011 | Kamada ........................ 474/160 |
| 2004/0043855 A1 * | 3/2004 | Wei ................................ 474/160 |
| 2006/0128511 A1 * | 6/2006 | Oishi et al. .................... 474/160 |
| 2006/0154767 A1 * | 7/2006 | Kamada ........................ 474/160 |
| 2007/0135250 A1 * | 6/2007 | Kamada ........................ 474/160 |

* cited by examiner

*Primary Examiner* — Henry Liu
(74) *Attorney, Agent, or Firm* — Global IP Counselors

(57) ABSTRACT

A bicycle sprocket is provided with a sprocket body and a plurality of sprocket teeth. The sprocket teeth extend radially outward from a root circle of the sprocket body with the sprocket teeth being circumferentially spaced around the outer periphery of the sprocket body. The sprocket teeth include at least one shift assist tooth that assists in a shifting operation from the bicycle sprocket to a smaller sprocket. The shift assist tooth has a maximum radial height as measured from the root circle of the sprocket body. The maximum radial height of the shift assist tooth is larger than a maximum radial height of a majority of remaining ones of the sprocket teeth as measured from the root circle of the sprocket body. The shift assist tooth has a radially inclined surface sloping toward the smaller sprocket as the radially inclined surface approaches radially toward the center rotational axis A.

12 Claims, 9 Drawing Sheets

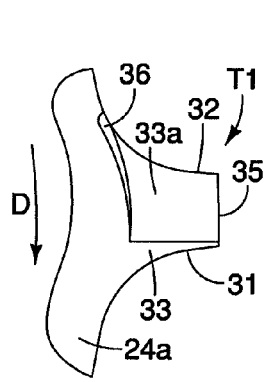
FIG. 8
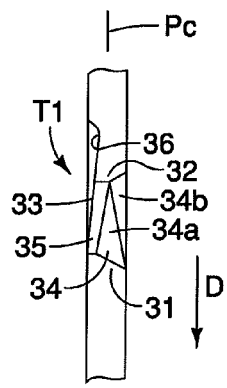
FIG. 9
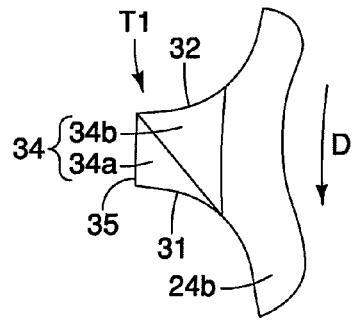
FIG. 10
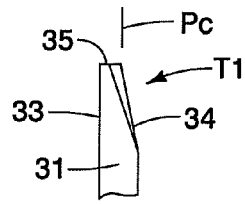
FIG. 11
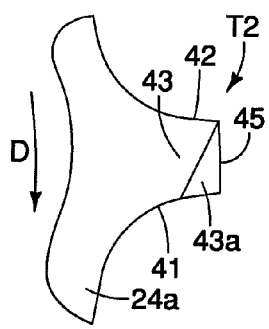
FIG. 12
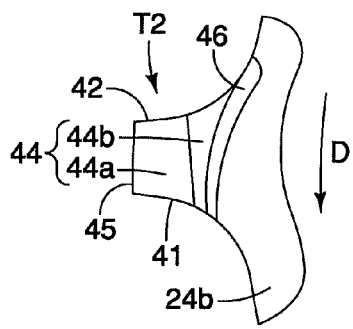
FIG. 13
FIG. 14
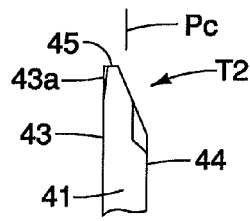
FIG. 15

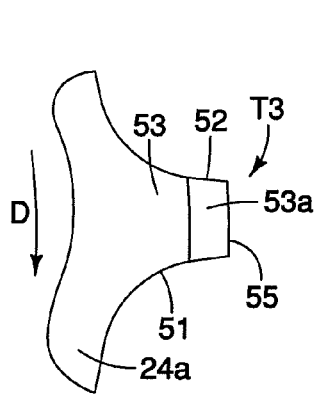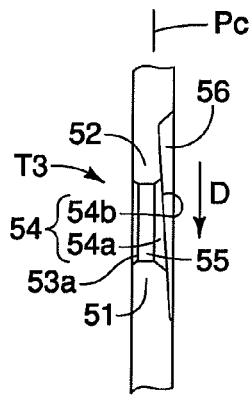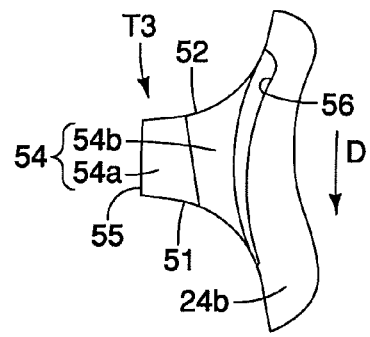
FIG. 16　　　FIG. 17　　　FIG. 18
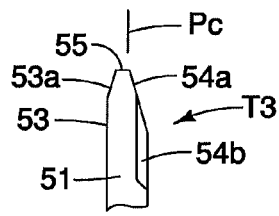
FIG. 19
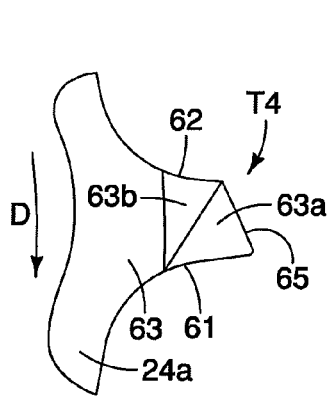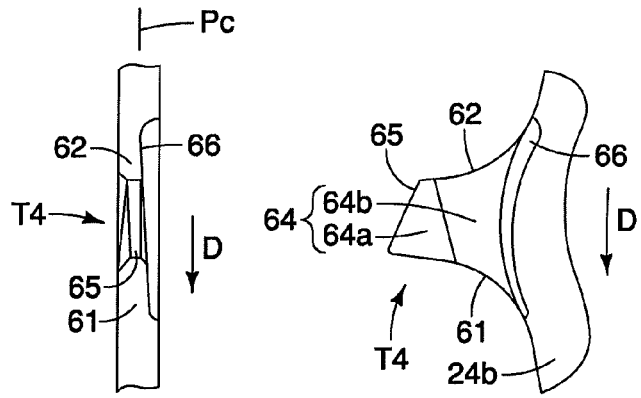
FIG. 20　　　FIG. 21　　　FIG. 22
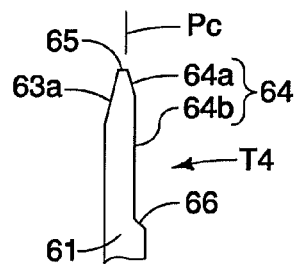
FIG. 23

BICYCLE SPROCKET

BACKGROUND OF THE INVENTION

1. Field of the Invention

This invention generally relates to a sprocket for a bicycle. More specifically, the present invention relates a sprocket mounted to a wheel of a bicycle, in which the sprocket has a teeth arrangement that provides smooth reliable shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned over the past years is the bicycle drive train. Specifically, manufacturers of bicycle components have been continually improving shifting performance of the various shifting components such as the shifter, the shift cable, the derailleur, the chain and the sprocket or sprockets.

One particular component of the drive train that has been extensively redesigned in the past years is the sprocket assembly for the bicycle. More specifically, the bicycle sprocket assembly has been designed with improved sprockets to provide smoother shifting. More specifically, the Hyper Glide sprocket assembly (HG rear sprocket assembly) described in U.S. Pat. No. 4,889,521 to Nagano has been developed and marketed worldwide. This sprocket assembly has been well accepted in the market and this engineering design for the sprocket assembly has become one of the industrial standards. Specifically, the HG rear sprocket assembly used with derailleurs in racing and mountain bicycles has become an industrial standard.

The HG sprockets typically have a chain guide surface on the smaller sprocket side of each sprocket, except for the smallest sprocket. The chain guide surface is positioned to receive a link plate and pin of the chain so as to move the chain much closer for smooth downshifting. Downshifting typically means shifting from a smaller rear sprocket to a larger rear sprocket so as to decrease gear ratio. Two adjacent sprockets are positioned relative to each other and relative to the chain guide surface with a particular phase relation. In order to maintain such phase relation, each sprocket has splines formed at its inner periphery. One of the splines is a different shape from the other splines to guide the sprockets on mating splines formed on the outer body of a multiple freewheel or free hub. The different shaped splines insure that adjacent sprockets are oriented in the proper phase relation.

SUMMARY OF THE INVENTION

One object of the present invention is to provide a sprocket for a sprocket assembly which provides smooth, reliable shifting performance.

The foregoing objects can basically be attained by providing a bicycle sprocket that mainly comprises a sprocket body and a plurality of sprocket teeth. The sprocket body has a center rotational axis. The sprocket teeth extend radially outward from a root circle of the sprocket body with the sprocket teeth being circumferentially spaced around the outer periphery of the sprocket body. The sprocket teeth include at least one shift assist tooth that assists in a shifting operation from the bicycle sprocket to a smaller sprocket. The at least one shift assist tooth has a maximum radial height as measured from the root circle of the sprocket body. The maximum radial height of the at least one shift assist tooth is larger than a maximum radial height of a majority of remaining ones of the sprocket teeth as measured from the root circle of the sprocket body. The at least one shift assist tooth has a radially inclined surface sloping toward the smaller sprocket as the radially inclined surface approaches radially toward the center rotational axis.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 8 is a partial outside elevational view of a first engagement tooth of the sprocket illustrated in FIGS. 3 and 4 as viewed from the small (top) sprocket facing side of the sprocket;

FIG. 9 is a partial outer edge view of the first engagement tooth illustrated in FIG. 8 of the sprocket illustrated in FIGS. 3 and 4;

FIG. 10 is a partial inside elevational view of the first engagement tooth illustrated in FIGS. 8 and 9 of the sprocket illustrated in FIGS. 3 and 4 as viewed from the large (low) sprocket facing side of the sprocket;

FIG. 11 is a partial downstream edge elevational view of the first engagement tooth illustrated in FIGS. 8 to 10 of the sprocket illustrated in FIGS. 3 and 4, as viewed along an upstream direction with respect to the rotational direction of the bicycle sprocket;

FIG. 12 is a partial outside elevational view of a second engagement tooth of the sprocket illustrated in FIGS. 3 and 4 as viewed from the small (top) sprocket facing side of the sprocket;

FIG. 13 is a partial outer edge view of the second engagement tooth illustrated in FIG. 12 of the sprocket illustrated in FIGS. 3 and 4;

FIG. 14 is a partial inside elevational view of the second engagement tooth illustrated in FIGS. 12 and 13 of the sprocket illustrated in FIGS. 3 and 4 as viewed from the large (low) sprocket facing side of the sprocket;

FIG. 15 is a partial downstream edge elevational view of the second engagement tooth illustrated in FIGS. 12 to 14 of the sprocket illustrated in FIGS. 3 and 4, as viewed along an upstream direction with respect to the rotational direction of the bicycle sprocket;

FIG. 16 is a partial outside elevational view of a third engagement tooth of the sprocket illustrated in FIGS. 3 and 4 as viewed from the small (top) sprocket facing side of the sprocket;

FIG. 17 is a partial outer edge view of the third engagement tooth illustrated in FIG. 16 of the sprocket illustrated in FIGS. 3 and 4;

FIG. 18 is a partial inside elevational view of the third engagement tooth illustrated in FIGS. 16 and 17 of the sprocket illustrated in FIGS. 3 and 4 as viewed from the large (low) sprocket facing side of the sprocket;

FIG. 19 is a partial downstream edge elevational view of the third engagement tooth illustrated in FIGS. 16 to 18 of the sprocket illustrated in FIGS. 3 and 4, as viewed along an upstream direction with respect to the rotational direction of the bicycle sprocket;

FIG. 20 is a partial outside elevational view of a first shift assist tooth of the sprocket illustrated in FIGS. 3 and 4 as viewed from the small (top) sprocket facing side of the sprocket;

FIG. 21 is a partial outer edge view of the first shift assist tooth illustrated in FIG. 20 of the sprocket illustrated in FIGS. 3 and 4;

FIG. 22 is a partial inside elevational view of the first shift assist tooth illustrated in FIGS. 20 and 21 of the sprocket illustrated in FIGS. 3 and 4 as viewed from the large (low) sprocket facing side of the sprocket;

FIG. 23 is a partial downstream edge elevational view of the first shift assist tooth illustrated in FIGS. 20 to 22 of the sprocket illustrated in FIGS. 3 and 4, as viewed along an upstream direction with respect to the rotational direction of the bicycle sprocket;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
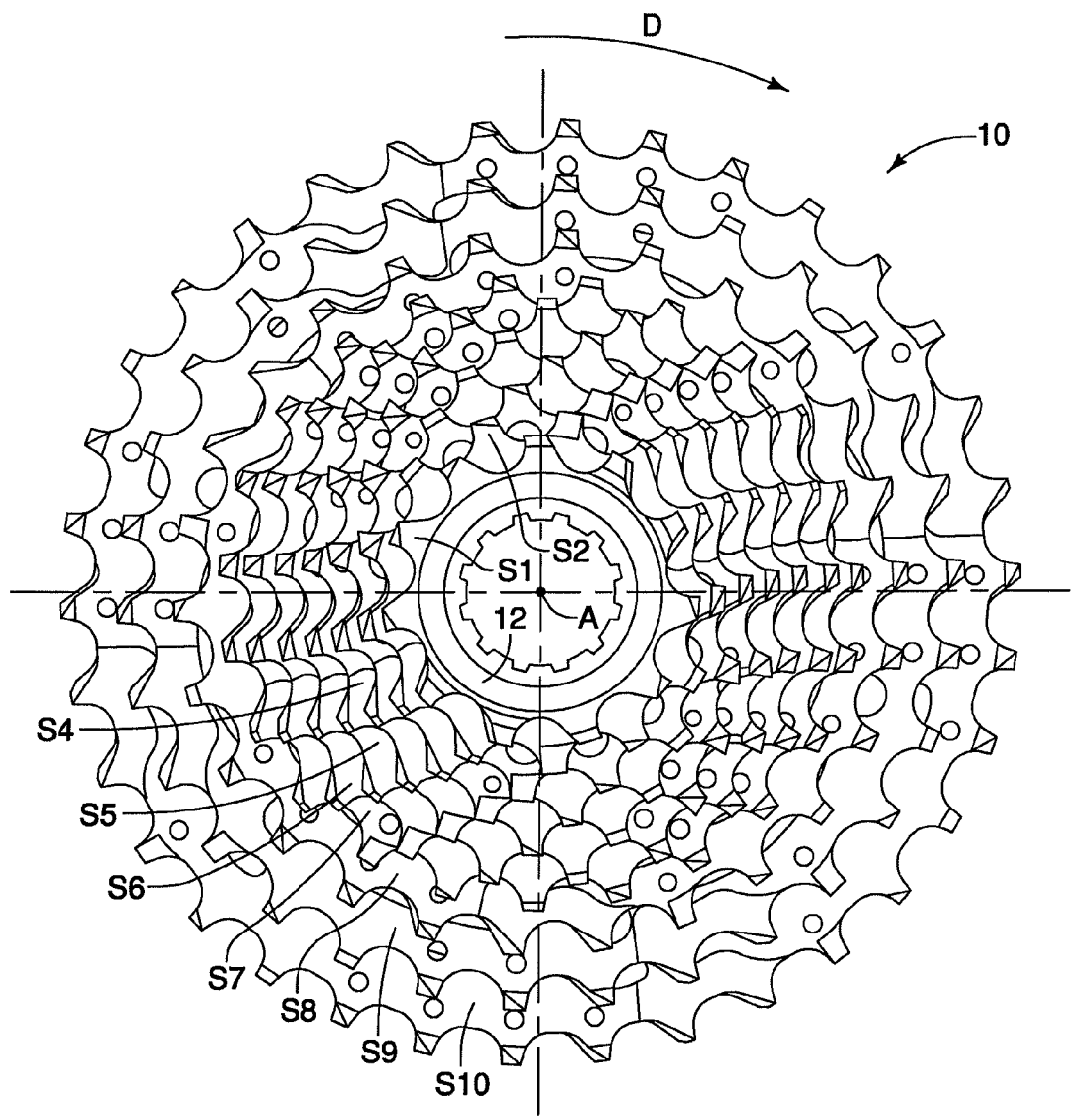
FIG. 1 is a side elevational view of the ten-stage sprocket assembly in accordance with in accordance with one illustrated embodiment.
Figure 2:
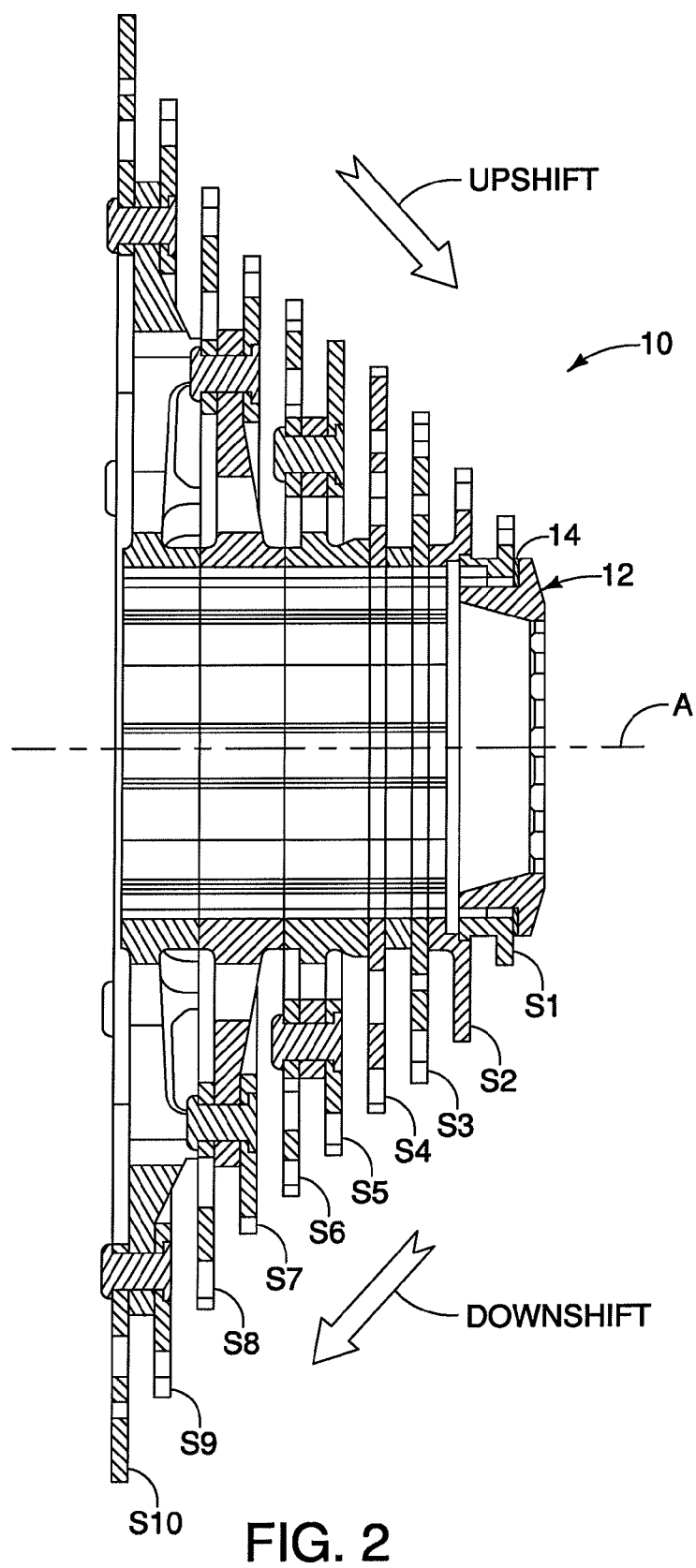
FIG. 2 is a cross sectional view of the ten-stage sprocket assembly as seen along section line 1-1 of FIG. 1.
Figure 3:
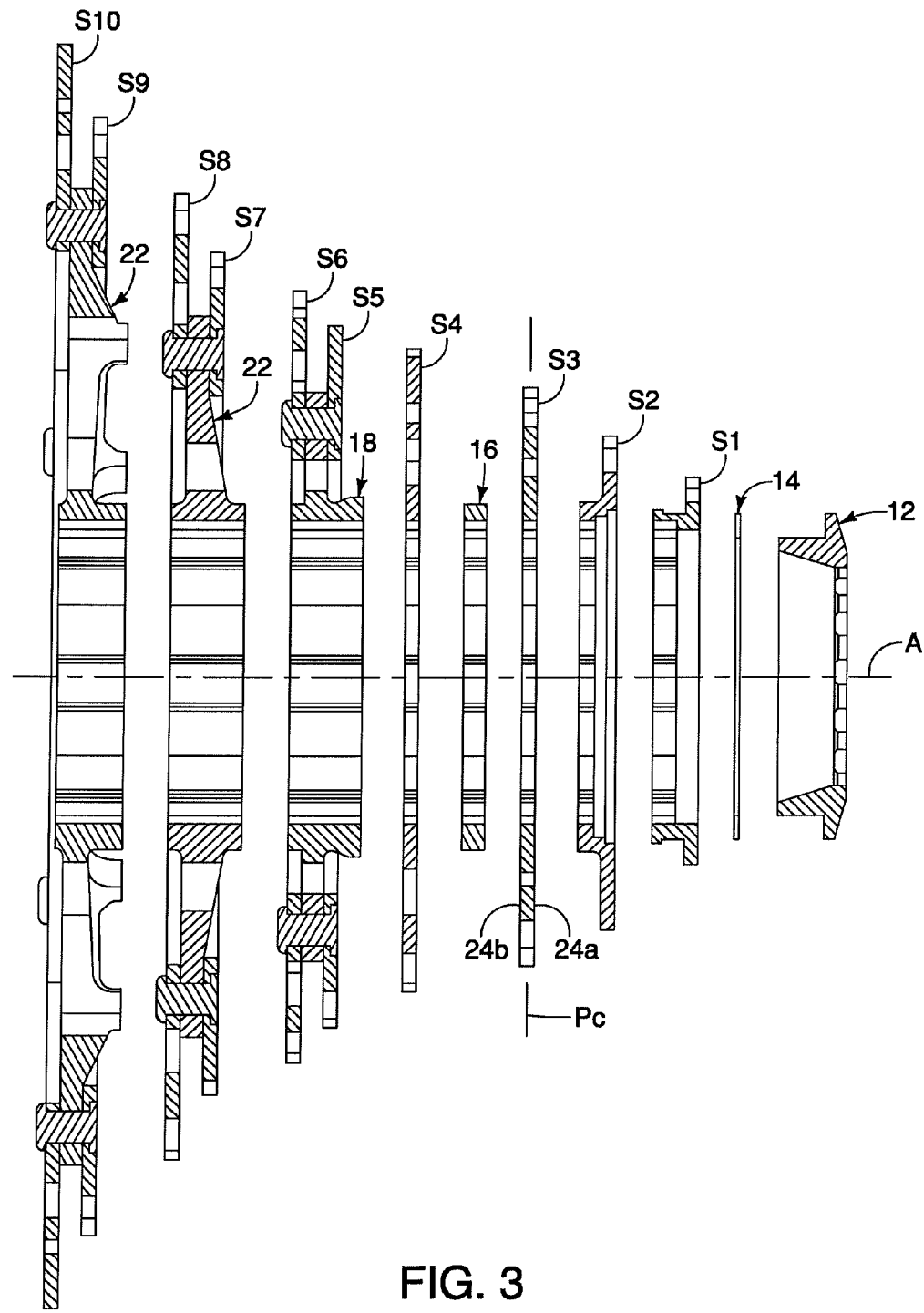
FIG. 3 is an exploded cross sectional view of the ten-stage sprocket assembly illustrated in FIG. 2.

Referring initially to FIGS. 1 to 3, a rear multi-stage sprocket assembly 10 is illustrated in accordance with a first embodiment. In the illustrated embodiment, the multi-stage sprocket assembly 10 includes a plurality of sprockets S1 to S10, a lock ring 12, a lock ring spacer 14, a first sprocket spacer 16, a second sprocket spacer 18, a first sprocket carrier 20 and a second sprocket carrier 22. The sprockets S1 to S10 are axially spaced from each other at predetermined intervals. The sprockets S1 to S10 are configured to be fixedly mounted on a freewheel (not shown) of a rear hub (not shown) in a relatively conventional manner such that the sprockets S1 to S10 rotate together about a center rotational axis A. The sprockets S1 to S10 typically rotate together in a forward rotational direction D (e.g., in a clockwise direction as viewed in FIG. 1) when the rider is pedaling in a forward (clockwise) direction to propel the bicycle in a forward direction.

As explained below, the sprockets S2 to S5 have specially configured teeth that aid in performing an upshifting operation from a larger diameter sprocket to a smaller diameter sprocket. The sprockets S1 and S6 to S10 can have relatively conventional teeth as shown or can be modified to include specially configured teeth that aid in performing an upshifting operation as needed and/or desired. Of course, it will be apparent to those skilled in the bicycle art from this disclosure that the sprocket assembly 10 in can have fewer or more sprockets. In other words, the sprocket assembly 10 can be any multi-stage sprocket assembly for a bicycle that uses a derailleur or the like and which includes at least one large sprocket and at least one small sprocket.

Figure 4:
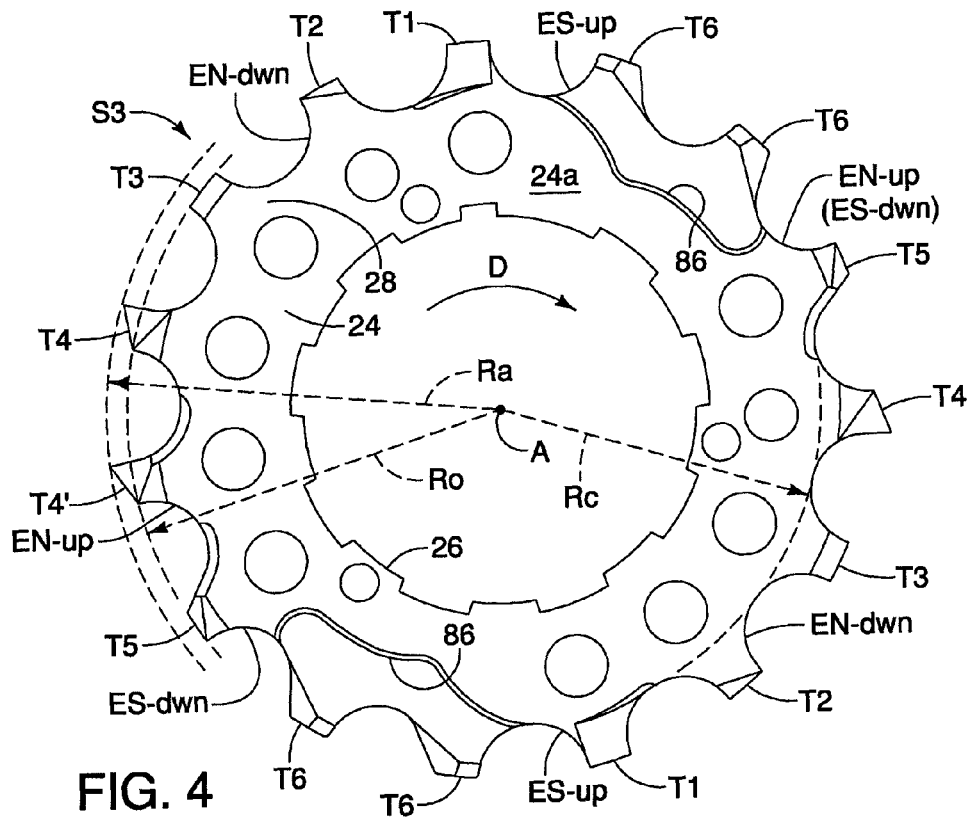
FIG. 4 is a side elevational view of a small sprocket facing side of one of the sprockets.
Figure 5:
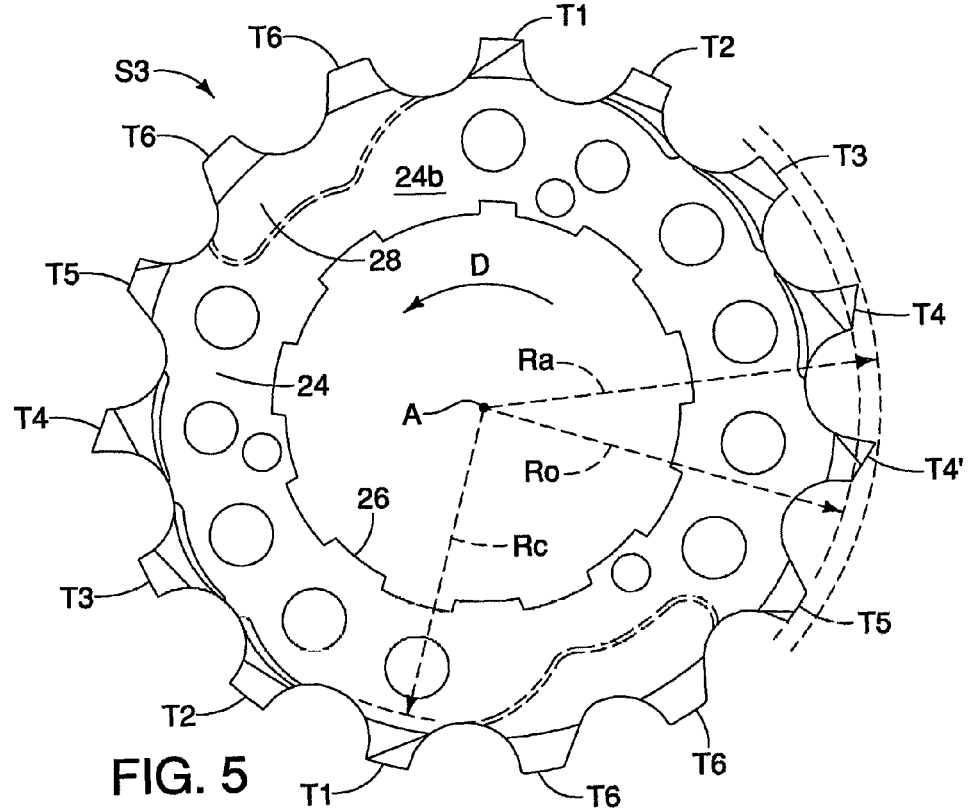
FIG. 5 is a side elevational view of a large sprocket facing side of one of the sprockets.
Figure 6:
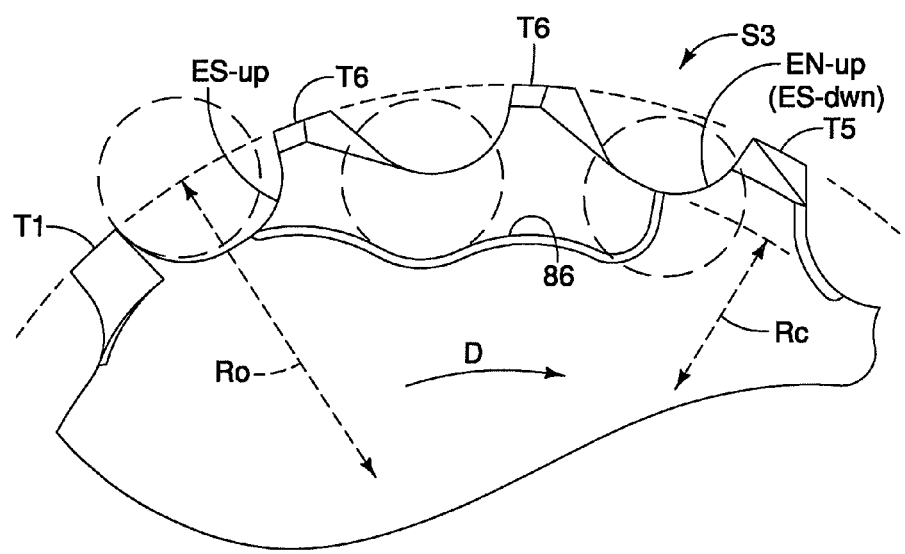
FIG. 6 is a partial side elevational view of the area including the first engagement tooth and three teeth downstream of the first engagement tooth with respect to the rotational direction of the bicycle sprocket, and three chain rollers in dashed lines to illustrate a down shift from a smaller sprocket not shown to the larger sprocket.
Figure 7:
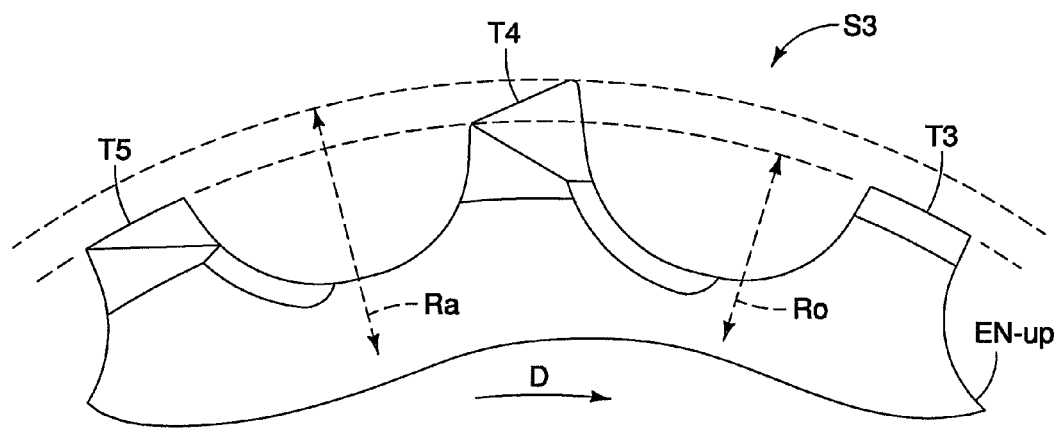
FIG. 7 is a partial side elevational view of the area including one shift assist tooth and one tooth on each side of the shift assist tooth with respect to the rotational direction of the bicycle sprocket.

As seen in FIGS. 1 to 3, the sprockets S1 to S10 are hard, rigid disc shaped members formed from a suitable material such as a metallic material. In the illustrated embodiment, the sprockets S1 to S10 are each a one-piece, unitary member formed of a metallic material that is suitable for a bicycle sprocket. In the illustrated embodiment, the sprocket S3, as seen in FIGS. 4 and 5, includes the basic teeth configurations that are also used in sprockets S2, S4 and S5. Basically, the sprockets S2 to S5 only differ in their overall diameter, number of teeth, hub mounting structure and the size/number of weight reducing openings (if any). Of course, the sprockets S2 to S5 can be different from each other with respect to other features not related to the present invention.

Referring to FIG. 2, the sprocket assembly 10 is illustrated in partial cross-section with arrows showing the directions of an upshift operation and a downshift operation. An upshift operation occurs when the chain is moved from a large sprocket to the next smaller sprocket, while a downshift operation occurs when the chain is shifted from a small sprocket to the next larger sprocket. The sprockets S1 to S10 are designed so that the chain can execute smooth downshifting and upshifting motions. In the illustrated embodiment, as mentioned above, the sprockets S1 and S6 to S10 are conventional, while the sprockets S2 to S5 include modified teeth to improve the up shifting of a chain. The sprockets S1 to S10 have the following teeth configuration: 11T-13T-15T-17T-19T-21T-23T-26T-30T-34T. The axial spacing between the sprockets S2 to S10 is about 2.35 millimeters, while the axial spacing between the sprockets S1 and S2 is about 2.26 millimeters. The sprocket body of the sprocket S1 has a thickness of about 1.96 millimeters, while the sprocket bodies of the sprockets S2-S10 have thicknesses of about 1.6 millimeters.

Referring now to FIGS. 4 and 5, since the parts of the sprockets S2 to S5 are essentially the same for each of the sprockets S2 to S5, with respect to the present invention, only the sprocket S3 will be illustrated in detail herein. Moreover, identical teeth of the sprockets S2 to S5 will be referred to with the same reference numerals. As seen in FIGS. 4 and 5, the sprocket S3 basically includes a sprocket body 24, a freewheel or hub mounting structure 26 and a chain engagement structure 28. In the case of sprocket S3, the sprocket body 24 is preferably integrally formed with the mounting structure 26 and the chain engagement structure 28 as a one-piece, unitary member.

The mounting structure 26 of the sprocket S3 is a splined bore that defines the inner periphery of the sprocket body 24. Of course, it will be apparent to those skilled in the art from this disclosure that the sprocket S3 can have other types of mounting structures that are suitable for securing the sprocket S3 to a bicycle hub. For example, it will be apparent to those skilled in the art from this disclosure that a sprocket carrier can be used for the mounting structure of the sprocket S3 as needed and/or desired. In any event, the mounting structure 26 of the sprocket S3 preferably has a plurality of splines with one or more splines having a different shape such that the splines engage corresponding splines on a sprocket mounting sleeve of a freewheel or the like in a known manner to fix the sprocket S3 at a predetermined rotational position relative to the remaining sprockets. The sprocket mounting sleeve is, in turn, rotatably mounted around a hub axle through ball bearings and a one-way clutch in a known manner.

The chain engagement structure 28 is formed on the outer periphery of the sprocket body 24. The chain engagement structure 28 includes a plurality of sprocket teeth T1, T2, T3, T4, T4', T5 and T6 with a plurality of troughs or roots interposed between the teeth T1, T2, T3, T4, T4', T5 and T6. Thus, the sprocket teeth T1, T2, T3, T4, T4', T5 and T6 extend radially outwardly from an outer periphery of the sprocket body 24 with the troughs interposed between the sprocket teeth T1, T2, T3, T4, T4', T5 and T6. Preferably, the sprocket teeth T1, T2, T3, T4, T4', T5 and T6 are equally spaced apart from each other. Thus, the troughs are arranged in an alternating manner between the sprocket teeth T1, T2, T3, T4, T4', T5 and T6 and equally spaced apart from each other. In the case of the sprocket S3, there are two of the teeth T1, two of the teeth T2, two of the teeth T3, two of the teeth T4, only one tooth T4', two of the teeth T5 and four of the teeth T6. As explained below, theses teeth T1, T2, T3, T4, T4', T5 and T6 are arranged to form two upshift paths and two downshift paths for each of the sprockets S2 to S5 (only sprocket S3 shown in detail).

The sprocket teeth T1 shall hereinafter be referred to as first engagement teeth T1, which is the first tooth to catch a chain when the chains is shifted from a smaller diameter sprocket to a larger diameter sprocket (i.e., a downshifting operation). The sprocket teeth T2 shall hereinafter be referred to as second engagement teeth T2, which is the second tooth to catch the chain when the chains is shifted from a smaller diameter sprocket to a larger diameter sprocket (i.e., a downshifting operation). The sprocket teeth T3 shall hereinafter be referred to as third engagement teeth T3, which is the third tooth to catch the chain when the chains is shifted from a smaller diameter sprocket to a larger diameter sprocket (i.e., a downshifting operation). As explained below, the sprocket teeth T4 and T4' shall hereinafter be referred to as shift assist teeth T4 and T4', since they assist in an upshifting operation from a larger diameter sprocket to a smaller diameter sprocket. The sprocket teeth T5 shall hereinafter be referred to as auxiliary teeth T5. The sprocket teeth T6 shall hereinafter be referred to as top side recessed tooth T6.

As seen in FIG. 1, the sprockets S2 to S5 are arranged such that the first engagement teeth T1 are circumferentially offset in order to create the proper phase relationship between the sprockets S2 to S5. In an upshifting operation from the larger sprocket to the smaller sprocket, the larger sprocket is considered the original sprocket, and the smaller sprocket is considered the receiving sprocket. In the downshifting process, the smaller sprocket is considered the original sprocket, and the larger sprocket is considered the receiving sprocket. When the chain is shifted from an original sprocket such as the sprocket S3 to the next smaller or larger sprocket such as the sprocket S2 or S4, the center point of the last roller of the chain that engages with the original sprocket is referred to as the escape point, and the center of the first roller of the chain that engages with the receiving sprocket is referred to as the engagement point. The chain links between the escape point and the engagement point form the upshift path or the downshift path of the chain during a chain shifting process. In the case of the sprocket S3, there are two upshifting escape points ES-up, two upshifting engagement points EN-up, two downshifting escape points ES-dwn, and two downshifting engagement points EN-dwn. The angle formed by the escape point and the engagement point to the center of the sprocket assembly 12 is defined as the phase angle between a pair of adjacent sprockets. In the downshifting motion this phase angle is referred to as the downshifting phase angle, while in the upshifting motion this phase angle is referred to as the upshifting phase angle.

As seen in FIG. 4, the outer limit of the sprocket body 24 is defined by a root circle having a root circle radius Rc. As is well known, the root circle Rc is a hypothetical circle defined by the bottom (radial innermost point) of the troughs or roots between the sprocket teeth T1, T2, T3, T4, T4', T5 and T6. Thus, the root portion of a sprocket tooth extends radially inward from the root circle Re towards the center rotational axis A. In this embodiment, the sprocket body 24 of the sprocket S3 has a first or small (top) sprocket facing side surface 24a (FIG. 4) and a second or large (low) sprocket facing side surface 24b (FIG. 5). As seen in FIG. 3, the sprocket body 24 of the sprocket S3 has a center plane Pc that bisect the sprocket body 24 between the first and second side surface 24a and 24b of the root portion of the sprocket body 24. The teeth T1, T2, T3, T5 and T6 have a tooth radius Ro, while shift assist teeth T4 and T4' have a tooth radius Ra that is larger than the tooth radius Ro by a prescribed amount (e.g., three millimeters±one millimeter). The relationships of the root circle radius Rc to the tooth radius Ro and the tooth radius Ra for the sprockets S3, S4 and S5 are shown below in the following Table 1.

TABLE 1

| Sprocket | Number of teeth (n) | Pitch (360/n) | Root Circle (Rc) | Tooth Radius (Ro) | Tooth T4 Radius (Ra) |
|---|---|---|---|---|---|
| S3 | 15 | 24.0000 | 52.88 mm | 61.68 mm | 64.68 mm |
| S4 | 17 | 21.1765 | 60.92 mm | 69.72 mm | 72.72 mm |
| S5 | 19 | 18.9474 | 68.96 mm | 77.76 mm | 80.76 mm |

As seen in FIGS. 4 and 5, the sprocket 14 rotates in the rotational direction D to drive a bicycle chain (not shown) in a drive direction. During a chain shifting process, the chain is shifted from one of the sprocket S1 to S10 to the next adjacent one of the sprockets S1 to S10 by a rear derailleur moving the chain in an axial direction relative to the center rotational axis A of the sprockets S1 to S10. Bicycle chains are well known, and thus, a bicycle chain will not be illustrated herein. Of course, the bicycle chain is a continuous loop that has a plurality of inner link plates and a plurality of outer link plates that are pivotally connected to each other by articulation chain pins and chain rollers. From the center of each of the chain rollers to the center of the next chain roller is about one-half inch (12.7 mm). This dimension is known as the "pitch" of the chain. The bicycle chain can be any chain that is used with a bicycle sprocket. Thus, the chain will not be described in further detail herein.

Turning now to FIGS. 8 to 11, the first engagement tooth T1 will now be discussed in more detail. In the case of the sprocket S3, there are two of the first engagement teeth T1. The first engagement teeth T1 is also considered a first downshift tooth in that it is designed to be the first downshift tooth to catch or fully engage the chain roller during a downshifting operation. The first engagement tooth T1 has a downstream edge 31, an upstream edge 32, a top side surface 33, a low side surface 34 and a circumferential tip surface 35. The top side surface 33 and the low side surface 34 define a base portion of the first engagement tooth T1.

As seen in FIGS. 8 and 9, the top side surface 33 of the first engagement tooth T1 has an inclined surface 33a that circumferentially slopes in an upstream direction towards the sprocket center plane Pc from the small (top) sprocket facing side surface 24a of the sprocket S3. The inclined surface 33a is forms an acute angle with the small (top) sprocket facing side surface 24a of the sprocket S3. The base of the top side surface 33 of the first engagement tooth T1 includes a recess 36 that extends along the inclined surface 33a with its radial dimension and its axial dimension with respect to the center rotational axis A becoming larger as the recess 36 approaches the upstream edge 32 from the downstream edge 31.

As seen in FIGS. 9 and 10, the low side surface 34 of the first engagement tooth T1 has a pair of inclined surfaces 34a and 34b. The inclined surface 34a circumferentially slopes in a downstream direction and radially slopes in a top sprocket side direction as the inclined surface 34a extends from the inclined surface 34b towards the downstream edge 31 and the circumferential tip surface 35. The inclined surface 34b radially slopes in a top sprocket side direction as the inclined surface 34b extends from the large (low) sprocket facing side surface 24b towards the inclined surface 34a. Thus, the inclined surface 33a and the inclined surfaces 34a and 34b result in the circumferential tip surface 35 of the first engagement tooth T1 being twisted with its downstream edge being twisted near the small (top) sprocket facing side surface 24a of the sprocket S3 and its upstream edge being disposed near the sprocket center plane Pc.

Turning now to FIGS. 12 to 15, the second engagement tooth T2 will now be discussed in more detail. In the case of the sprocket S3, there are two of the second engagement teeth T2. The second engagement tooth T2 is also considered a second downshift tooth in that it is designed to be the second downshift tooth to catch or fully engage a chain roller during a downshifting operation. The second engagement tooth T2 has a downstream edge 41, an upstream edge 42, a top side surface 43, a low side surface 44 and a circumferential tip surface 45. The top side surface 43 and the low side surface 44 define a base portion of the second engagement tooth T2.

As seen in FIGS. 12 and 13, the top side surface 43 of the second engagement tooth T2 has an inclined surface 43a that circumferentially slopes in a downstream direction towards the sprocket center plane Pc from the small (top) sprocket facing side surface 24a of the sprocket S3. The inclined surface 43a also radially slopes towards the sprocket center plane Pc from the small (top) sprocket facing side surface 24a of the sprocket S3. The inclined surface 43a is forms an acute angle with the small (top) sprocket facing side surface 24a of the sprocket S3.

As seen in FIGS. 13 and 14, the low side surface 44 of the second engagement tooth T2 has a pair of inclined surfaces 44a and 44b. The inclined surface 44a radially slopes in a top sprocket side direction as the inclined surface 44a extends from the inclined surface 44b towards the circumferential tip surface 45. The inclined surface 44b circumferentially slopes in a top sprocket side direction as the inclined surface 44b extends from the downstream edge 41 towards the upstream edge 42. The base of the low side surface 44 of the second engagement tooth T2 includes a recess 46 that extends along the inclined surface 44b with its radial dimension and its axial dimension with respect to the center rotational axis A becoming larger as the recess 46 approaches the upstream edge 42 from the downstream edge 41. Thus, the inclined surfaces 44a and 44b result in the circumferential tip surface 45 of the second engagement tooth T2 being offset towards the small (top) sprocket facing side surface 24a of the sprocket S3 with respect to the sprocket center plane Pc. Such a recess as the recess 46 aids smooth upshifting operation because a chain can be positioned closer to a smaller sprocket at the location of the second engagement tooth T2 during an upshifting operation because of the presence of the recess 46.

Turning now to FIGS. 16 to 19, the third engagement tooth T3 will now be discussed in more detail. In the case of the sprocket S3, there are two of the third engagement teeth T3. The third engagement tooth T3 is also considered a third downshift tooth in that it is designed to be the third downshift tooth to catch or fully engage a chain roller during a downshifting operation. The third engagement tooth T3 has a downstream edge 51, an upstream edge 52, a top side surface 53, a low side surface 54 and a circumferential tip surface 55. The top side surface 53 and the low side surface 54 define a base portion of the third engagement tooth T3.

As seen in FIGS. 16 and 17, the top side surface 53 of the third engagement tooth T3 has an inclined surface 53a that radially slopes in a low sprocket side direction towards the sprocket center plane Pc from the small (top) sprocket facing side surface 24a of the sprocket S3. As seen in FIGS. 17 and 18, the low side surface 54 of the third engagement tooth T3 has a pair of inclined surfaces 54a and 54b. The inclined surface 54a radially slopes in a top sprocket side direction as the inclined surface 54a extends from the inclined surface 54b towards the circumferential tip surface 55. The inclined surface 54b circumferentially slopes in a top sprocket side direction as the inclined surface 54b extends from the downstream edge 51 towards the upstream edge 52. The base of the low side surface 54 of the third engagement tooth T3 includes a recess 56 that extends along the inclined surface 54b with its radial dimension and its axial dimension with respect to the center rotational axis A becoming larger as the recess 56 approaches the upstream edge 52 from the downstream edge 51. Thus, the inclined surfaces 54a and 54b result in the circumferential tip surface 55 of the third engagement tooth T3 being offset towards the small (top) sprocket facing side surface 24a of the sprocket S3 with respect to the sprocket center plane Pc. Such a recess as the recess 56 aids smooth upshifting operation because a chain can be positioned closer to a smaller sprocket at the location of the third engagement tooth T3 during upshifting operation because of the presence of the recess 56.

Turning now to FIGS. 20 to 23, the shift assist tooth T4 will now be discussed in more detail. In the case of the sprocket S3, there are two of the shift assist teeth T4. While the shift assist tooth T4 is preferably disposed next to the third engagement tooth T3 in the upstream direction, the shift assist tooth T4 can also be disposed next to the first engagement tooth T1 in the upstream direction or next to the second engagement tooth T2 in the upstream direction. The shift assist teeth T4 have the same radial height as the shift assist teeth T4' with respect to a radial direction of the sprocket S3. The shift assist teeth T4 and T4' are taller than the other teeth with respect to a radial direction of the sprocket S3. Because the shift assist teeth T4 and T4' are taller than the other tooth, a chain contacts the shift assist teeth T4 and T4' earlier during an upshifting operation in comparison with the case in which the shift assist teeth are equal to (or shorter than) the other teeth in its radial height. The shift assist tooth T4 has a downstream edge 61, an upstream edge 62, a top side surface 63, a low side surface 64 and a circumferential tip surface 65. The top side surface 63 and the low side surface 64 define a base portion of the shift assist tooth T4.

As seen in FIGS. 20 and 21, the top side surface 63 of the shift assist tooth T4 has a pair of inclined surfaces 63a and 63b. The inclined surface 63a circumferentially slopes in a downstream direction and radially in a low sprocket side direction as the inclined surface 63a extends from the inclined surface 63b towards the downstream edge 61 and the circumferential tip surface 65. The inclined surface 63a also radially slopes towards the sprocket center plane Pc from the small (top) sprocket facing side surface 24a of the sprocket S3. Because of the presence of the inclined surface 63a, the shift assist tooth T4 can effectively guide a chain toward a smaller sprocket after contacting the chain during upshifting operation. The inclined surface 63b radially slopes in a low sprocket side direction as the inclined surface 63b extends from the small (top) sprocket facing side surface 24a towards the inclined surface 63a. During an upshifting operation, a chain is guided toward a smaller sprocket due to the inclined surface 63a.

As seen in FIGS. 21 and 22, the low side surface 64 of the shift assist tooth T4 has a pair of inclined surfaces 64a and 64b. The inclined surface 64a radially slopes in a top sprocket side direction as the inclined surface 64a extends from the inclined surface 64b towards the circumferential tip surface 65. The inclined surface 64b circumferentially slopes in a top sprocket side direction as the inclined surface 64b extends from the downstream edge 61 towards the upstream edge 62. The base of the low side surface 64 of the shift assist tooth T4 includes a recess 66 that extends along the inclined surface 64b with its radial dimension and its axial dimension with respect to the center rotational axis A becoming larger as the recess 66 approaches the upstream edge 62 from the downstream edge 61. Thus, the inclined surfaces 64a and 64b result in the circumferential tip surface 65 of the shift assist tooth T4 being offset towards the small (top) sprocket facing side surface 24a of the sprocket S3 with respect to the sprocket center plane Pc. The recess 66 aids in a smooth upshifting operation because a chain can be positioned closer to a smaller sprocket at the location of the shift assist tooth T4 during upshifting operation because of the presence of the recess 66.

Turning now to FIGS. 24 to 27, the shift assist tooth T4' will now be discussed in more detail. In the case of the sprocket S3, there is only one shift assist tooth T4'. The shift assist tooth T4' has a downstream edge 71, an upstream edge 72, a top side surface 73, a low side surface 74 and a circumferential tip surface 75. The top side surface 73 and the low side surface 74 define a base portion of the shift assist tooth T4'. The shift assist tooth T4' is similar to the shift assist tooth T4.

Figures 24, 25, 26:
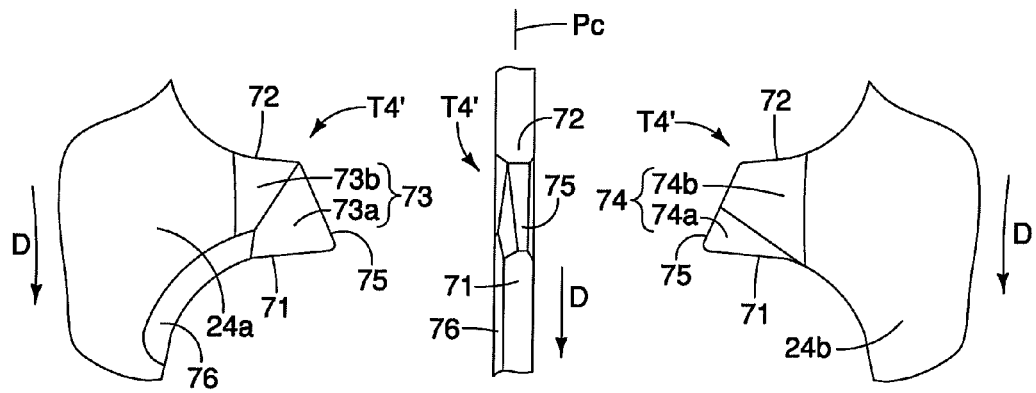
FIG. 24 is a partial outside elevational view of a second shift assist tooth of the sprocket illustrated in FIGS. 3 and 4 as viewed from the small (top) sprocket facing side of the sprocket.
FIG. 25 is a partial outer edge view of the second shift assist tooth illustrated in FIG. 24 of the sprocket illustrated in FIGS. 3 and 4.
FIG. 26 is a partial inside elevational view of the second shift assist tooth illustrated in FIGS. 24 and 25 of the sprocket illustrated in FIGS. 3 and 4 as viewed from the large (low) sprocket facing side of the sprocket.
Figure 27:
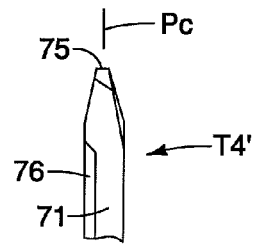
FIG. 27 is a partial downstream edge elevational view of the second shift assist tooth illustrated in FIGS. 24 to 26 of the sprocket illustrated in FIGS. 3 and 4, as viewed along an upstream direction with respect to the rotational direction of the bicycle sprocket.

As seen in FIGS. 24 and 25, the top side surface 73 of the shift assist tooth T4' has a pair of inclined surfaces 73a and 73b, which are similar to inclined surfaces 63a and 63b of the shift assist tooth T4. However, the inclinations of the inclined surfaces 73a and 73b are greater than the surfaces 63a and 63b of the shift assist tooth T4. The inclined surface 73a circumferentially slopes in a downstream direction and radially in a low sprocket side direction as the inclined surface 73a extends from the inclined surface 73b towards the downstream edge 71 and the circumferential tip surface 75. The greater inclination of the inclined surface 73a allows the shift assist tooth T4' to more effectively guide a chain toward a smaller sprocket after contacting the chain during upshifting operation. The inclined surface 73b radially slopes in a low sprocket side direction as the inclined surface 73b extends from the small (top) sprocket facing side surface 24a towards the inclined surface 73a. The base of the shift assist tooth T4' is provided with a recess 76 along the downstream edge 71. During an upshifting operation, a chain is guided toward a smaller sprocket due to the inclined surface 73a.

As seen in FIGS. 25 and 26, the low side surface 74 of the shift assist tooth T4' has a pair of inclined surfaces 74a and 74b, which are similar to inclined surfaces 64a and 64b of the shift assist tooth T4. However, the inclinations of the inclined surfaces 74a and 74b differ from the inclinations the surfaces 63a and 63b of the shift assist tooth T4. The inclined surface 74a radially slopes in a top sprocket side direction as the inclined surface 74a extends from the inclined surface 74b towards the circumferential tip surface 75. The inclined surface 74b radially slopes in a top sprocket side direction as the inclined surface 74b extends from the large (low) sprocket facing side surface 24b of the sprocket S3 towards the inclined surface 74a. Thus, the inclined surfaces 73a, 73b, 74a and 74b result in the circumferential tip surface 75 of the shift assist tooth T4' being offset towards the large (low) sprocket facing side surface 24b of the sprocket S3 with respect to the sprocket center plane Pc.

Figures 28, 29, 30:
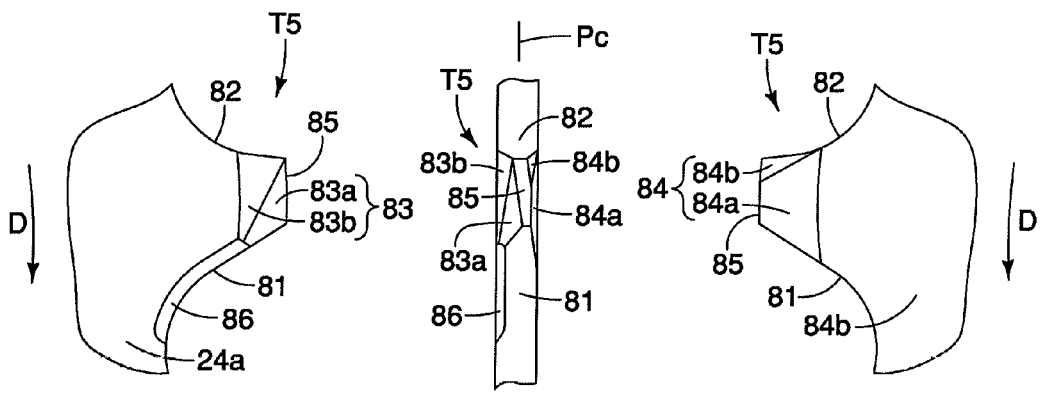
FIG. 28 is a partial outside elevational view of an auxiliary tooth of the sprocket illustrated in FIGS. 3 and 4 as viewed from the small (top) sprocket facing side of the sprocket.
FIG. 29 is a partial outer edge view of the auxiliary tooth illustrated in FIG. 31 of the sprocket illustrated in FIGS. 3 and 4.
FIG. 30 is a partial inside elevational view of the auxiliary tooth illustrated in FIGS. 28 and 29 of the sprocket illustrated in FIGS. 3 and 4 as viewed from the large (low) sprocket facing side of the sprocket.

Turning now to FIGS. 28 to 30, the auxiliary teeth T5 will be briefly discussed. In the case of the sprocket S3, there are two of the auxiliary teeth T5. The auxiliary tooth T5 has a downstream edge 81, an upstream edge 82, a top side surface 83, a low side surface 84 and a circumferential tip surface 85. The top side surface 83 and the low side surface 84 define a base portion of the auxiliary teeth T5. As seen in FIGS. 28 and 29, the top side surface 83 of the auxiliary tooth T5 has a pair of inclined surfaces 83a and 83b. The inclined surface 83a circumferentially slopes in a downstream direction and radially in a low sprocket side direction as the inclined surface 83a extends from the inclined surface 83b towards the downstream edge 81 and the circumferential tip surface 85. The inclined surface 83b radially slopes in a low sprocket side direction as the inclined surface 83b extends from the small (top) sprocket facing side surface 24a towards the inclined surface 83a. The base of the auxiliary tooth T5 is provided with a recess 86 along the downstream edge 81. During an upshifting operation, a chain is guided toward a smaller sprocket due to the inclined surface 83a.

As seen in FIGS. 29 and 30, the low side surface 84 of the auxiliary tooth T5 has a pair of inclined surfaces 84a and 84b. The inclined surface 84a radially slopes in a top sprocket side direction as the inclined surface 84a extends from the inclined surface 84b towards the circumferential tip surface 85. The inclined surface 84b circumferentially slopes in an upstream direction and radially slopes in a top sprocket side direction as the inclined surface 84b extends from the large (low) sprocket facing side surface 24b of the sprocket S3 towards the inclined surface 84a. Thus, the inclined surfaces 83a, 83b, 84a and 84b result in the circumferential tip surface 85 of the auxiliary tooth T5 being offset towards the large (low) sprocket facing side surface 24b of the sprocket S3 with respect to the sprocket center plane Pc.

Turning now to FIGS. 31 to 34, the top side recessed tooth T6 will now be discussed in more detail. In the case of the sprocket S3, there are four of the top side recessed teeth T6, with the top side recessed tooth T6 being grouped into two pairs of the top side recessed teeth T6. The top side recessed tooth T6 has a downstream edge 91, an upstream edge 92, a top side surface 93, a low side surface 94 and a circumferential tip surface 95. The top side surface 93 and the low side surface 94 define a base portion of the top side recessed tooth T6. A recess 96 extends along the bases of each of the pairs of the top side recessed tooth T6 to aid in down shifting to a larger sprocket. The recess 96 is provided to position a chain closer to a larger sprocket during a downshifting operation. Therefore, a cutout (i.e. tooth-missing portion) can also be formed by simply removing the top side recessed tooth T6 instead of providing the recess 96 at the root portions of the top side recessed teeth T6.

Figures 31, 32, 33:
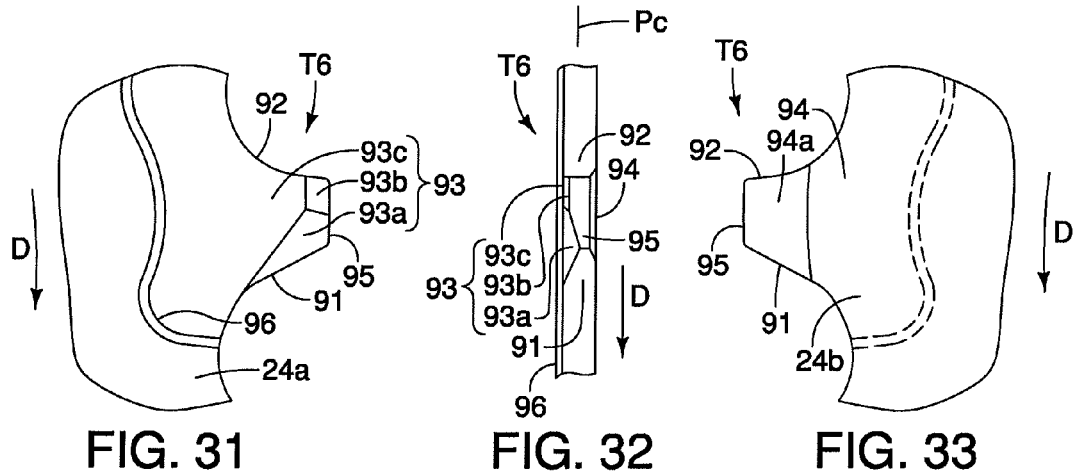
FIG. 31 is a partial outside elevational view of a top side recessed tooth of the sprocket illustrated in FIGS. 3 and 4 as viewed from the small (top) sprocket facing side of the sprocket.
FIG. 32 is a partial outer edge view of the top side recessed tooth illustrated in FIG. 31 of the sprocket illustrated in FIGS. 3 and 4.
FIG. 33 is a partial inside elevational view of the top side recessed tooth illustrated in FIGS. 31 and 32 of the sprocket illustrated in FIGS. 3 and 4 as viewed from the large (low) sprocket facing side of the sprocket.
Figure 34:
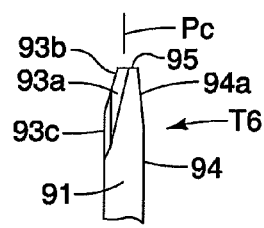
FIG. 34 is a partial downstream edge elevational view of the top side recessed tooth illustrated in FIGS. 31 to 33 of the sprocket illustrated in FIGS. 3 and 4, as viewed along an upstream direction with respect to the rotational direction of the bicycle sprocket.

As seen in FIGS. 31 and 32, the top side surface 93 of the top side recessed tooth T6 has a pair of inclined surfaces 93a and 93b and a non-inclined surface 93c. The inclined surface 93a circumferentially slopes in a downstream direction and radially slopes in a low sprocket side direction as the inclined surface 93a extends from the non-inclined surface 93c towards the downstream edge 91 and the circumferential tip surface 95. The inclined surface 93b radially slopes in a low sprocket side direction as the inclined surface 93b extends from the non-inclined surface 93c towards the circumferential tip surface 95. The non-inclined surface 93c is parallel to the sprocket center plane Pc and to the side surfaces 24a and 24b of the sprocket S3. The non-inclined surface 93c is from the small (top) sprocket facing side surface 24a of the sprocket S3 towards the sprocket center plane Pc due to the recess 96 in the root portion of the sprocket body 24. As seen in FIGS. 32 and 33, the low side surface 94 of the top side recessed tooth T6 has an inclined surface 94a that radially slopes in a top sprocket side direction as the inclined surface 94a extends from the large (top) sprocket facing side surface 24b of the sprocket S3 towards the circumferential tip surface 95.

To better understand the above description of the sprocket assembly 10, some of the terms will now be further explained for the sake of clarity. As used herein, the terms "forward", "rearward", "above", "below", "lateral" and "transverse" as well as similar directional terms refer to those directions of the sprocket assembly 10 with respect a bicycle in its normal riding position on a horizontal surface. Accordingly, directional terms, as utilized to describe the sprocket assembly 10 in the claims, should be interpreted relative to a bicycle in its normal riding position on a horizontal surface. Also, the term "downshift" and "upshift" as used herein in reference to the rear sprocket assembly 10 should be interpreted to mean a shift from smaller to larger sprocket and from larger to smaller sprocket, respectively, as indicated by the arrows in FIG. 2. Moreover, the terms "phase relation", "phase relationship" and "angular phase relation" as used herein should be construed to mean the angular relationship between a pair of adjacent sprockets. As used herein, the term "smaller sprocket" refers to a sprocket having a smaller diameter with respect to the claimed sprocket and the term "larger sprocket" refers to a sprocket having a larger diameter with respect to the sprocket in question. As used herein, the term "smaller sprocket facing side surface" refers to a side surface of the sprocket in question that faces a sprocket having a smaller diameter with respect to the sprocket in question and the term "larger sprocket facing side surface" refers to a side surface of the sprocket in question that faces a sprocket having a larger diameter with respect to the sprocket in question. As used herein, the terms "radially inclined", "radially slopes" and the like refers to an inclination or slope that in a radial direction with respect to the sprocket center plane as viewed along a section plane that is perpendicular to the sprocket center plane and that passing through the center rotational axis of the sprocket in question. As used herein, the terms "circumferentially inclined", "circumferentially slopes" and the like refers to an inclination or slope that in a circumferential direction with respect to the sprocket center plane as viewed along a section plane that is perpendicular to the sprocket center plane and that passing through the center rotational axis of the sprocket in question. As used herein, the term "adjacent tooth" refers to an immediate adjacent tooth to a tooth in question with no intervening teeth located between the "adjacent tooth" and the tooth in question. The absence of the use of the modifying term "at least one" before another term should not be construed to preclude additional ones of the modified terms. For example, As used herein, when the term "at least one" is not used to modify another term, in the claims, the term "first engagement tooth" and "at least one first engagement tooth" should both be construed to include more than first engagement tooth.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a sprocket body having a center rotational axis; and
a plurality of sprocket teeth extending radially outward from a root circle of the sprocket body with the sprocket teeth being circumferentially spaced around the outer periphery of the sprocket body,
the sprocket teeth including at least one shift assist tooth that assists in a shifting operation from the bicycle sprocket to a smaller sprocket, the at least one shift assist tooth having a maximum radial height as measured from the root circle of the sprocket body, the maximum radial height of the at least one shift assist tooth being larger than a maximum radial height of a majority of remaining ones of the sprocket teeth as measured from the root circle of the sprocket body, and the at least one shift assist tooth having a radially inclined surface sloping toward the smaller sprocket as the radially inclined surface approaches radially toward the center rotational axis.

2. The bicycle sprocket according to claim 1, wherein the at least one shift assist tooth includes two shift assist teeth.

3. The bicycle sprocket according to claim 2, wherein the two shift assist teeth are identical.

4. The bicycle sprocket according to claim 2, wherein the two shift assist teeth are consecutive teeth.

5. The bicycle sprocket according to claim 2, wherein the two shift assist teeth are non-consecutive teeth.

6. The bicycle sprocket according to claim 1, wherein the sprocket teeth include a first engagement tooth that is engaged when a bicycle chain is shifted from the sprocket toward a larger sprocket, the at least one shift assist tooth being located within five teeth from the first engagement tooth in an upstream direction with respect to a rotational direction of the bicycle sprocket.

7. The bicycle sprocket according to claim 6, wherein the sprocket teeth include a recessed portion formed in a root portion of a smaller sprocket facing side surface of the sprocket body at a tooth of the sprocket teeth adjacent the first engagement tooth in a downstream direction with respect to the rotational direction of the bicycle sprocket.

8. The bicycle sprocket according to claim 6, wherein the sprocket teeth include a recessed portion formed in a root portion of a larger sprocket facing side surface of the sprocket body at a tooth of the sprocket teeth that is located downstream of the at least one shift assist tooth in a downstream direction with respect to the rotational direction of the bicycle sprocket and upstream of the first engagement tooth in the upstream direction with respect to the rotational direction of the bicycle sprocket.

9. The bicycle sprocket according to claim 6, wherein the sprocket teeth include a recessed portion formed in a root portion of a larger sprocket facing side surface of the sprocket body at a tooth of the sprocket teeth that is within two teeth from the at least one shift assist tooth in a downstream direction with respect to the rotational direction of the bicycle sprocket.

10. The bicycle sprocket according to claim 6, wherein the sprocket teeth include a recessed portion formed in a root portion of a larger sprocket facing side surface of the sprocket body at a tooth of the sprocket teeth adjacent the at least one shift assist tooth in a downstream direction with respect to the rotational direction of the bicycle sprocket.

11. The bicycle sprocket according to claim 6, wherein the sprocket teeth include two consecutive recessed portions formed in a root portion of a larger sprocket facing side surface of the sprocket body at two consecutive teeth of the sprocket teeth, respectively, with the two consecutive teeth being located consecutively adjacent the at least one shift assist tooth in a downstream direction with respect to the rotational direction of the bicycle sprocket.

12. The bicycle sprocket according to claim 1, wherein the sprocket teeth include at least one tooth located within two teeth from the at least one shift assist tooth in a downstream direction with respect to a rotational direction of the bicycle sprocket, and
the at least one tooth has a recessed portion formed in a root portion of a larger sprocket facing side surface of the sprocket body.

* * * * *